US012561171B2

(12) United States Patent
Miyahara et al.

(10) Patent No.: US 12,561,171 B2
(45) Date of Patent: Feb. 24, 2026

(54) OPTIMIZATION FUNCTION GENERATION APPARATUS, OPTIMIZATION FUNCTION GENERATION METHOD, AND PROGRAM

(71) Applicant: NTT, Inc., Tokyo (JP)

(72) Inventors: Kazuhiro Miyahara, Tokyo (JP); Keitaro Horikawa, Tokyo (JP); Kinya Tomita, Tokyo (JP)

(73) Assignee: NTT, Inc., Tokyo (JP)

( * ) Notice: Subject to any disclaimer, the term of this patent is extended or adjusted under 35 U.S.C. 154(b) by 685 days.

(21) Appl. No.: 17/797,071

(22) PCT Filed: Feb. 6, 2020

(86) PCT No.: PCT/JP2020/004543
§ 371 (c)(1),
(2) Date: Aug. 2, 2022

(87) PCT Pub. No.: WO2021/157007
PCT Pub. Date: Aug. 12, 2021

(65) Prior Publication Data
US 2023/0056830 A1     Feb. 23, 2023

(51) Int. Cl.
*G06F 9/50*     (2006.01)
*G06N 10/80*     (2022.01)
(52) U.S. Cl.
CPC ........... *G06F 9/5038* (2013.01); *G06N 10/80* (2022.01)
(58) Field of Classification Search
CPC ....................................................... G06F 9/50
See application file for complete search history.

(56) References Cited

U.S. PATENT DOCUMENTS

2011/0047201 A1*  2/2011  Macready .............. G06N 10/60
                                                            703/3
2014/0187427 A1*  7/2014  Macready ................ G06N 7/01
                                                            706/46

OTHER PUBLICATIONS

Venturelli, David, et al. Job Shop Scheduling Solver Based on Quantum Annealing, Oct. 17, 2016 (Year: 2016).*

(Continued)

*Primary Examiner* — Lewis A Bullock, Jr.
*Assistant Examiner* — Jordan Scott Motter

(57)     ABSTRACT

Provided is a technology for creating an optimization function for solving a scheduling problem for creating a process execution plan such that execution of all processes will be completed by a predetermined time point under constraint conditions regarding the processes and resources required by the processes, the optimization function relating to a variable that represents a quantum state. The technology includes: an input setting unit that sets a set P of processes, a set R of resources, a maximum time point End, the time p.time it takes to execute a process p, a set p.precede of processes of which execution needs to be completed before execution of the process p is started, and a set r.processes of processes that require a resource r when executed, as input to the scheduling problem for creating a plan of execution start time points of processes such that execution of all processes included in the set P will be completed by the maximum time point End under the predetermined constraint conditions; and an optimization function creation unit that creates the optimization function using the input.

6 Claims, 4 Drawing Sheets

INPUT

110 INPUT SETTING UNIT

190

120 OPTIMIZATION FUNCTION CREATION UNIT

RECORDING UNIT

OPTIMIZATION FUNCTION

100 OPTIMIZATION FUNCTION CREATION APPARATUS

(56)                 References Cited

OTHER PUBLICATIONS

Venturelli, et al. (2016) "Job-Shop Scheduling Solver Based on Quantum Annealing", Proceeding of the 11th Workshop on Constraint Satisfaction Techniques for Planning and Scheduling (COPLAS), Jun. 14, 2016, pp. 25-34, [online],[retrieved on Jun. 11, 2020], Retrieved from the Internet :<URL: http://icaps 16. icaps-conference. org/coplas.html> and <URL: http://icaps 16.icaps-conference.org/proceedings/coplas16.pdf>.

Hamasaki, et al. (2019) "Study on Job Scheduling Method of HPC System Using Accelerator for combination optimization Problem", IPSJ SIG Technical Report, Feb. 26, 2019, vol. 2019-HPC-168, No. 12, pp. 1-9 with English translation generated by computer.

Coffrin, et al. (2019) "Evaluating Ising Processing Units with Interger Programming", arXiv: 1707.00355v2, [online], arXiv (Cornell University), Jun. 19, 2019, version v2, pp. 1-19, [retrieved on Jun. 11, 2020], Retrieved from the Internet: <URL: https://arxiv.org/abs/1707.00355v2> and <URL: https://arxiv.org/pdf/1707.00355v2. pdf>.

A. Lucas (2014) "Ising formulations of many NP problems," frontiers in Physics, [online], [searched on Jan. 17, 2020], Internet <URL: https://www.frontiersin.org/articles/10.3389/fphy.2014.00005/full>.

D-Wave Systems Inc, "The D-Wave 2000Q™ Quantum Computer Technology Overview," [online], [searched on Jan. 17, 2020], Internet <URL: https://www.dwavesys.com/sites/default/files/D-Wave%202000Q%20Tech%20Collateral_1029F.pdf>.

Nagaki et al. (2016) "A coherent Ising machine for 2000-node optimization problems," Science, vol. 354, Issue 6312, pp.603-606.

Yoshimura, et al. (2019) "An efficient Ising model mapping method to solve induced subgraph isomorphism problems using Ising machines," Adiabatic Quantum Computing Conference.

* cited by examiner

PROCESS SET P

| PROCESS ID | time | precede |
|------------|------|---------|
| 1 | 1 | {} |
| 2 | 1 | {1} |
| 3 | 1 | {2} |
| 4 | 1 | {3} |
| 5 | 2 | {4} |
| 6 | 1 | {5} |
| 7 | 2 | {3} |
| 8 | 1 | {7} |
| 9 | 3 | {8} |
| 10 | 1 | {6, 9} |

RESOURCE SET R

| RESOURCE ID | processes |
|-------------|-----------|
| 1 | {5, 8} |

MAXIMUM TIME POINT End=10

Fig. 1

EXECUTION START TIME POINT start(p)

| PROCESS ID | start(p) |
|---|---|
| 1 | 0 |
| 2 | 1 |
| 3 | 2 |
| 4 | 3 |
| 5 | 6 |
| 6 | 7 |
| 7 | 3 |
| 8 | 5 |
| 9 | 6 |
| 10 | 9 |

Fig. 2

| | t | | | | | | | | | |
|---|---|---|---|---|---|---|---|---|---|---|
| | 0 | 1 | 2 | 3 | 4 | 5 | 6 | 7 | 8 | 9 |
| $x_{p,t}$ | 0 | 0 | 0 | 0 | 1 | 1 | 1 | 1 | 1 | 1 |
| $x_{p,t\text{-}p.time}$ | 0 | 0 | 0 | 0 | 0 | 0 | 1 | 1 | 1 | 1 |
| $1\text{-}x_{p,t\text{-}p.time}$ | 1 | 1 | 1 | 1 | 1 | 1 | 0 | 0 | 0 | 0 |
| $x_{p,t}\text{-}x_{p,t\text{-}p.time}$ | 0 | 0 | 0 | 0 | 1 | 1 | 0 | 0 | 0 | 0 |

Fig 3

OPTIMIZATION FUNCTION GENERATION APPARATUS, OPTIMIZATION FUNCTION GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/004543, filed on 6 Feb. 2020, the disclosure of which is hereby incorporated herein by reference in its entirety.

TECHNICAL FIELD

The present invention relates to a technology for creating an optimization function for solving a combination optimization problem using a quantum computer.

BACKGROUND ART

It is thought difficult to efficiently solve a combination optimization problem with use of a von Neumann type computer that is currently widely used. Therefore, in recent years, research and development are made on quantum annealing machines and Ising machines, which are computers that can solve a combination optimization problem more efficiently than a von Neumann type computer.

These new computers can calculate a solution of a target combination optimization problem at high speed by taking, as input, an optimization function with which the combination optimization problem is expressed as an objective function of QUBO (Quadratic Unconstrained Binary Optimization) or an Ising Hamiltonian.

Conventionally, methods for designing a graph partitioning problem, a graph clique problem, and a graph isomorphism problem as objective functions of QUBO or Ising Hamiltonians are devised (see NPLs 1, 2, 3, and 4).

CITATION LIST

Non Patent Literature

[NPL 1] A. Lucas, "Ising formulations of many NP problems," frontiers in Physics (2014), [online], [searched on Jan. 17, 2020], Internet <URL: https://www.frontiersin.org/articles/10.3389/fphy.2014.00005/f ull>

[NPL 2] D-Wave Systems Inc, "The D-Wave 2000Q™ Quantum Computer Technology Overview," [online], [searched on Jan. 17, 2020], Internet <URL: https://www.dwavesys.com/sites/default/files/D-Wave %202000Q %20 Tech %20Collateral1029F.pdf>

[NPL 3] Takahiro Inagaki et al., "A coherent Ising machine for 2000-node optimization problems," Science, vol. 354, Issue 6312, pp. 603-606, 2016.

[NPL 4] N. Yoshimura, M. Tawada, S. Tanaka, J. Arai, S. Yagi, H. Uchiyama, and N. Togawa, "An efficient ising model mapping method to solve induced subgraph isomorphism problems using ising machines," Adiabatic Quantum Computing Conference 2019.

SUMMARY OF THE INVENTION

Technical Problem

A scheduling problem for creating a process execution plan such that execution of all processes will be completed by a predetermined time point under constraint conditions regarding the processes and resources required by the processes is one of combination optimization problems, and accordingly, it is expected that a solution of the scheduling problem can be found at high speed using a quantum annealing machine or an Ising machine. However, NPLs 1 to 4 only disclose objective functions of QUBO and Ising Hamiltonians for solving specific problems related to graphs, and an objective function of QUBO and an Ising Hamiltonian for the scheduling problem described above are unknown.

Therefore, an object of the present invention is to provide a technology for creating an optimization function for solving a scheduling problem for creating a process execution plan such that execution of all processes will be completed by a predetermined time point under constraint conditions regarding the processes and resources required by the processes, the optimization function relating to a variable that represents a quantum state.

Means for Solving the Problem

An aspect of the present invention includes: an input setting unit configured to set a set P of processes, a set R of resources, a maximum time point End, the time p.time it takes to execute a process $p(\in P)$, a set p.precede($\subseteq P$) of processes of which execution needs to be completed before execution of the process p is started, and a set r.processes ($\subseteq P$) of processes that require a resource $r(\in R)$ when executed, as input to a scheduling problem for creating a plan of execution start time points of processes such that execution of all processes included in the set P will be completed by the maximum time point End under predetermined constraint conditions; and an optimization function creation unit configured to create an optimization function for solving the scheduling problem using the input, the optimization function relating to a variable that represents a quantum state.

Effects of the Invention

According to the present invention, it is possible to create an optimization function for solving a scheduling problem on which predetermined constraint conditions are imposed, the optimization function relating to a variable that represents a quantum state.

BRIEF DESCRIPTION OF DRAWINGS

FIG. 1 is a diagram showing an example of input to a scheduling problem.

FIG. 2 is a diagram showing an example of output of the scheduling problem.

FIG. 3 is a diagram showing $1 - x_{p,t-p.time}$ and $x_{p,t} - x_{p,t-p.time}$ for the case where p.time=2.

DESCRIPTION OF EMBODIMENTS

Figure 4:
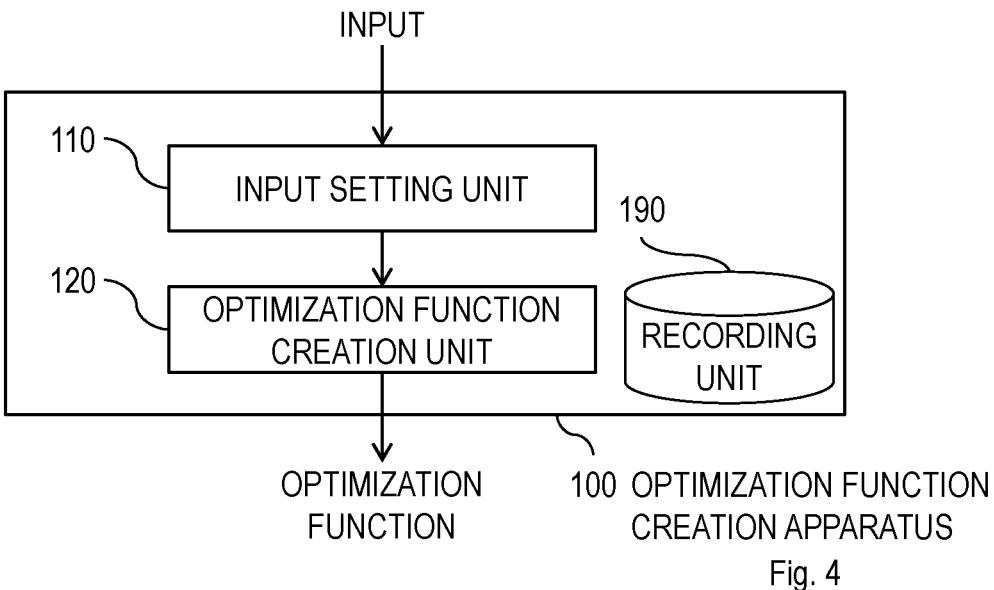
FIG. 4 is a block diagram showing a configuration of an optimization function creation apparatus 100.

The following describes an embodiment of the present invention in detail. It should be noted that constitutional units that have the same function are denoted with the same number, and overlapping descriptions thereof are omitted.

Before describing the embodiment, notation in the present specification will be explained.

$\wedge$ (caret) indicates a superscript. For example, $x^{y \wedge z}$ indicates that $y^z$ is the superscript of x, and $x_{y \wedge z}$ indicates that $y^z$ is the subscript of x. _ (underscore) indicates a subscript. For example, $x^{y\_z}$ indicates that $y_z$ is the superscript of x, and $x_{y\_z}$ indicates that $y_z$ is the subscript of x.

Superscripts of a letter x, such as "$\wedge$" and "~" in $\hat{x}$ and $\tilde{x}$, are to be written directly above "x", but these are written as $\hat{x}$ and $\tilde{x}$ due to constraints of notation in the specification.

TECHNICAL BACKGROUND

A combination optimization problem treated in the embodiment of the present invention is a scheduling problem for creating a plan of execution start time points of processes such that execution of all of the processes will be completed by a predetermined time point under predetermined constraint conditions. Here, the predetermined constraint conditions are a "constraint regarding a process order" and a "constraint regarding resource contention". The following describes the "constraint regarding the process order" and the "constraint regarding resource contention".
(1) Constraint Regarding Process Order The constraint regarding the process order is a condition that in order to start execution of a process, execution of all processes that need to be completed before execution of the process is started needs to be completed.
(2) Constraint Regarding Resource Contention The constraint regarding resource contention is a condition that, out of processes that require the same resource, only one process can be executed at the same time.

Next, input and output of the scheduling problem will be described.
(1) Input

The following are input to the scheduling problem.
A set P (hereinafter referred to as a "process set") of processes for which the plan is to be created.
A set R (hereinafter referred to as a "resource set") of resources that are required for execution of the processes.
A time point End (hereinafter referred to as the "maximum time point", End is a predetermined constant) by which execution of all processes included in the set P needs to be completed.

Also, the following values are input with respect to each process $p \in P$.
The time (execution time) $p.time \in N$ (N represents a set of natural numbers) it takes to execute the process p.
A set $p.precede \subseteq P$ of processes (preceding processes) of which execution needs to be completed before execution of the process p is started.

Also, the following value is input with respect to each resource $r \in R$.
A set $r.processes \subseteq P$ of processes that require the resource r when executed.
(2) Output The following is output of the scheduling problem.
An execution start time point start(p) of each process $p \in P$.

The execution start time point start(p) satisfies the following conditions (a), (b), and (c).
(a) Constraint Regarding Completion of Processes A constraint regarding completion of processes is a condition that each process needs to be completed by the maximum time point End, and can be expressed as follows.

$$start(p)+p.time \leq End$$

(b) Constraint Regarding Process Order

As described above, the constraint regarding the process order is a condition that in order to start execution of a process, execution of preceding processes needs to be completed before execution of the process is started, and can be expressed as follows.

$$start(q)+q.time \leq start(p) \text{ holds true for } q \in p.precede.$$

(C) Constraint Regarding Resource Contention

As described above, the constraint regarding resource contention is a condition that, out of processes that require the same resource, only one process can be executed at the same time, and can be expressed as follows.

$$|\{p \in r.processes | start(p) \leq t \leq start(p)+p.time\}| \leq 1 \text{ holds} \\ \text{true for } 0 \leq t \leq End,$$

(|S|) represents the number of elements of a set S).

FIG. 1 shows an example of input to the scheduling problem. FIG. 2 shows an example of output of the scheduling problem.

A quantum bit that is used to solve the scheduling problem will be described. Here, the quantum bit is a variable that takes a value 1 or 0 and represents a quantum state. That is, in the scheduling problem treated in the present invention, the quantum bit $x_{p,t}$ is defined as follows.

$x_{p,t}$: "1" in a case where the time point t is at or after the execution start time point of the process p, and otherwise "0". However, this applies when $p \in P$ and $0 \leq t < End-p.time$ are satisfied. $x_{p,t}$ is a constant "1" in the case where $t \geq End-p.time$.

As a result of $x_{p,t}$ being defined as the constant "1" for the case where $t \geq End-p.time$, the constraint regarding completion of processes will be satisfied. It should be noted that, by using the symbol $\leftrightarrow$ of equivalence, the definition of the quantum bit $x_{p,t}$ can also be expressed as "$x_{p,t}=1 \leftrightarrow$ the time point t is at or after the execution start time point of the process p".

By using the quantum bit $x_{p,t}$ defined as described above, it is possible to express a state before execution of the process is completed and a state where the process is being executed. Specifically, the state before execution of the process is completed is expressed using $1-x_{p,t-p.time}$, and the state where the process is being executed is expressed using $x_{p,t}-x_{p,t-p.time}$. Actually, the following hold true.

$$1-x_{p,t-p.time}=1 \leftrightarrow \text{at the time point } t, \text{execution of the} \\ \text{process } p \text{ has not been completed.}$$

$$x_{p,t}-x_{p,t-p.time}=1 \leftrightarrow \text{the process } p \text{ is being executed at} \\ \text{the time point } t.$$

It should be noted that $x_{p,t}=0$ in the case where $t<0$. When a constant constraint is incorporated in the quantum bit $x_{p,t}$ as described above, a situation where the value of $x_{p,t-p.time}$ is indefinite is avoided.

FIG. 3 shows $1-x_{p,t-p.time}$ and $x_{p,t}-x_{p,t-p.time}$ for the case where p.time=2.

Based on the above, the following describes an objective function of QUBO. Here, when the value of an expression that expresses a constraint is 0, the expression represents a state where the constraint is satisfied, and when the value of the expression is greater than 0, the expression represents a state where the constraint is not satisfied.

An objective function JSP of QUBO can be defined using the following expression.

$$JSP \hspace{4cm} \text{[Math. 1]}$$

$$=AfterStart+Order+Resource \hspace{2cm} (1)$$

Here, AfterStart is an expression that expresses a constraint for defining the meaning of the quantum bit $x_{p,t}$, Order is an expression that expresses the constraint regarding the process order, and Resource is an expression that expresses the constraint regarding resource contention.

The expression AfterStart expresses a constraint that "when the quantum bit $x_{p,t}$ has become "1" at a time point, the quantum bit $x_{p,t}$ will be "1" after that time point". Due to this constraint, the time point at which the quantum bit $x_{p,t}$ becomes "1" from "0" indicates the execution start time point of the process p.

[Math. 2]

$$\text{AfterStart} = \sum_{0 \leq t < End-1} \sum_{p \in P} x_{p,t}(1 - x_{p,t+1}) \qquad (2)$$

The expression (2) will be described. In expression $x_{p,t}$ $(1-x_{p,t+1})$, $x_{p,t}$ is "1" when "$x_{p,t}=1$" holds true for the time point t, and $1-x_{p,t+1}$ is "1" when "$x_{p,t+1}=0$" holds true for the time point t+1. Accordingly, if the quantum bit $x_{p,t}$ changes from "1" to "0" when the time point shifts from t to t+1, the constraint is violated. Therefore, the expression AfterStart expresses the constraint that "when the quantum bit $x_{p,t}$ has become "1" at a time point, the quantum bit $x_{p,t}$ will be "1" after that time point".

Variation

In the case of AfterStart of the expression (2), penalty is determined only based on the number of points at which the constraint is violated, i.e., the number of points at which the quantum bit $x_{p,t}$, changes from "1" to "0", and this cannot lead to avoidance of constraint violation. Therefore, it is also possible to weight the expression $x_{p,t}(1-x_{p,t+1})$ as shown in the following expression AfterStart so that the closer it is to a state where "there is no violation of the constraint", the smaller the penalty becomes.

[Math. 3]

$$\text{AfterStart} = \sum_{0 \leq t < End-1} \sum_{p \in P} (t+1) * x_{p,t}(1 - x_{p,t+1}) \qquad (2a)$$

The expression Order expresses the constraint regarding the process order.

[Math. 4]

$$\text{Order} = \sum_{0 \leq t < End} \sum_{p \in P} \sum_{q \in p.precede} x_{p,t}(1 - x_{q,t-q.time}) \qquad (3)$$

The expression (3) will be described. In expression $x_{p,t}$ $(1-x_{q,t-q.time})$, $x_{p,t}$ becomes "1" after execution of the process p is started, and $1-x_{q,t-q.time}$ is "1" before execution of the process q is completed. Accordingly, if execution of the process p is started before execution of the process q is completed, the expression $x_{p,t}$ $(1-x_{q,t-q.time})$ is "1" and the constraint is violated. Therefore, the expression Order expresses the constraint regarding the process order.

The expression Resource expresses the constraint regarding resource contention.

[Math. 5]

$$\text{Resource} = \sum_{r \in R} \sum_{0 \leq t < End} \text{Count}(r, t)(\text{Count}(r, t) - 1) \qquad (4)$$

$$\text{Count}(r, t) = \sum_{p \in r.processes} (x_{p,t} - x_{p,t-p.time}) \qquad (5)$$

Here, Count(r, t) represents the number of processes that use a resource r at the time point t. This can be understood from the fact that $x_{p,t}-x_{p,t-p.time}=1$ indicates that the process p is being executed at the time point t.

The expression (4) will be described. Expression Count (r, t) (Count (r, t)−1) is "0" when the value of Count(r, t) is 0 or 1, and accordingly, when the value of Count(r, t) is 2 or more, the constraint is violated. Therefore, the expression Resource expresses the constraint regarding resource contention.

As described above, by using the quantum bit $x_{p,t}$ that is a variable that represents a particular state by taking the value 1 and represents a state other than the particular state by taking the value 0, the function AfterStart of the expression (2) (function AfterStart of the expression (2a)), the function Order of the expression (3), and the function Resourse of the expression (4) are defined as functions that take the value 0 when the constraints expressed by the respective expressions are satisfied, and otherwise take values greater than 0. Thus, the objective function JSP of QUBO is designed so as to take the minimum value when all the constraints expressed by the expressions AfterStart, Order, and Resourse are satisfied. A solution of the objective function JSP of QUBO can be found using a quantum annealing machine or an Ising machine.

First Embodiment

An optimization function creation apparatus 100 creates an optimization function for solving a scheduling problem, the optimization function relating to a variable that represents a quantum state. Here, the scheduling problem is a problem for creating a plan of execution start time points of processes such that execution of all processes included in a set P of processes will be completed by the maximum time point End under predetermined constraint conditions. The predetermined constraint conditions are the constraint regarding the process order described in the technical background, i.e., the condition (hereinafter referred to as the "first constraint condition") that start (q)+q.time≤start (p) (start(p) represents the execution start time point of the process p) is satisfied with respect to processes p∈P and q∈p.precede, and the constraint regarding resource contention, i.e., the condition (hereinafter referred to as the "second constraint condition") that |{p∈r.processes|start(p)≤t≤start (p)+p.time}|≤1 is satisfied with respect to each time point t up to the maximum time point End and each resource r∈R. Here, a quantum bit that represents a particular state by taking the value 1 and represents a state other than the particular state by taking the value 0 is used as the variable that represents a quantum state. Specifically, the quantum bit $x_{p,t}$ used here is defined so as to represent, with the value 1, a state where the time point t is at or after the execution start time point of the process p and represent a state other than that state with the value 0.

Figure 5:
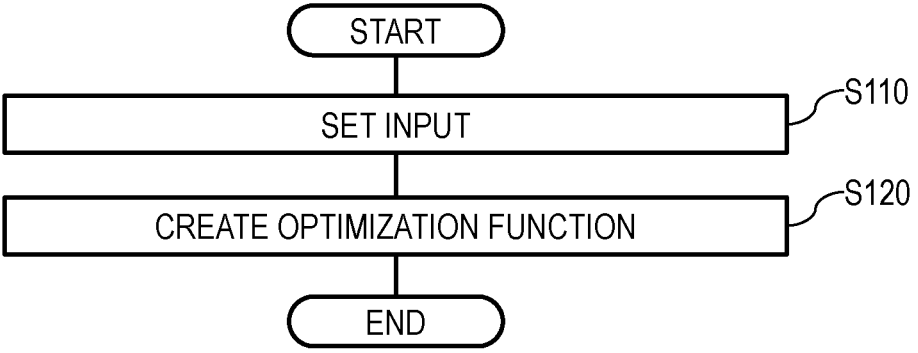
FIG. 5 is a flowchart showing operation of the optimization function creation apparatus 100.

The following describes the optimization function creation apparatus 100 with reference to FIGS. 4 and 5. FIG. 4 is a block diagram showing a configuration of the optimization function creation apparatus 100. FIG. 5 is a flowchart showing operation of the optimization function creation apparatus 100. As shown in FIG. 4, the optimization function creation apparatus 100 includes an input setting unit 110, an optimization function creation unit 120, and a recording unit 190. The recording unit 190 is a constitutional unit that records information necessary for processing performed in the optimization function creation apparatus 100, as appropriate.

Operation of the optimization function creation apparatus 100 will be described based on FIG. 5.

In step S110, the input setting unit 110 takes, as input, a set P of processes, a set R of resources, the maximum time point End, the time p.time it takes to execute a process p($\in$P), a set p.precede ($\subseteq$P) of processes of which execution needs to be completed before execution of the process p is started, and a set r.processes($\subseteq$P) of processes that require a resource r($\in$R) when executed, and sets these pieces of data as input to the scheduling problem.

In step S120, the optimization function creation unit 120 takes, as input, the input to the scheduling problem set in step S110, creates an optimization function for solving the scheduling problem using the input, and outputs the optimization function. Here, the optimization function is a function that is defined using the quantum bit $x_{p,t}$, specifically, an objective function of QUBO defined based on a function that expresses the meaning of the quantum bit $x_{p,t}$, a function that expresses the first constraint condition, and a function that expresses the second constraint condition.

The objective function of QUBO is the function JSP expressed by the expression (1). The function expressing the meaning of the quantum bit $x_{p,t}$ is the function AfterStart expressed by the expression (2) or the function AfterStart expressed by the expression (2a). The function expressing the first constraint condition is the function Order expressed by the expression (3). The function expressing the second constraint condition is the function Resourse expressed by the expression (4).

The function expressing the meaning of the quantum bit $x_{p,t}$ is defined so as to take the minimum value when the meaning of the quantum bit $x_{p,t}$ is expressed correctly. More specifically, the function takes the value 0 when the meaning of the quantum bit $x_{p,t}$ is expressed correctly, and otherwise takes a value greater than 0. The function expressing the first constraint condition is defined so as to take the minimum value when the first constraint condition is satisfied. More specifically, the function takes the value 0 when the first constraint condition is satisfied, and otherwise takes a value greater than 0. Similarly, the function expressing the second constraint condition is defined so as to take the minimum value when the second constraint condition is satisfied. More specifically, the function takes the value 0 when the second constraint condition is satisfied, and otherwise takes a value greater than 0.

Accordingly, the objective function JSP of QUBO, which is the optimization function, is designed so as to take the minimum value when the first constraint condition and the second constraint condition are satisfied.

Variation

As the optimization function, an Ising Hamiltonian in which a spin is used can be used instead of the objective function of QUBO in which the quantum bit is used. Here, the spin is a variable that takes a value 1 or −1 and represents a quantum state. The spin s and the quantum bit x can be interconverted using expressions (6) and (7).

[Math. 6]

$$x = \frac{s+1}{2} \tag{6}$$

$$s = 2x - 1 \tag{7}$$

That is, when the value of the quantum bit is 1, the value of the spin is 1, and when the value of the quantum bit is 0, the value of the spin is −1.

In the following, the spin that represents a particular state by taking the value 1 and represents a state other than the particular state by taking the value −1 is used as the variable that represents a quantum state. Specifically, the spin $s_{p,t}$ used here is defined so as to represent, with the value 1, a state where the time point t is at or after the execution start time point of the process p and represent a state other than that state with the value −1. In this case, the optimization function is a function defined using the spin $s_{p,t}$, specifically, an Ising Hamiltonian defined based on a function that expresses the meaning of the spin $s_{p,t}$, a function that expresses the first constraint condition, and a function that expresses the second constraint condition.

The Ising Hamiltonian is a function that is obtained by applying the variable conversion shown above to the function JSP expressed by the expression (1). The function expressing the meaning of the spin $s_{p,t}$ is a function obtained by applying the variable conversion shown above to the function AfterStart expressed by the expression (2) or the function AfterStart expressed by the expression (2a). The function expressing the first constraint condition is a function obtained by applying the variable conversion shown above to the function Order expressed by the expression (3). The function expressing the second constraint condition is a function obtained by applying the variable conversion shown above to the function Resourse expressed by the expression (4).

The function expressing the meaning of the spin $s_{p,t}$ is defined so as to take the minimum value when the meaning of the spin $s_{p,t}$ is expressed correctly. More specifically, the function takes the value 0 when the meaning of the spin $s_{p,t}$ is expressed correctly, and otherwise takes a value greater than 0. The function expressing the first constraint condition is defined so as to take the minimum value when the first constraint condition is satisfied. More specifically, the function takes the value 0 when the first constraint condition is satisfied, and otherwise takes a value greater than 0. Similarly, the function expressing the second constraint condition is defined so as to take the minimum value when the second constraint condition is satisfied. More specifically, the function takes the value 0 when the second constraint condition is satisfied, and otherwise takes a value greater than 0.

Accordingly, the Ising Hamiltonian, which is the optimization function, is designed so as to take the minimum value when the first constraint condition and the second constraint condition are satisfied.

It should be noted that the optimization function, which is the output of the optimization function creation apparatus 100, is input to a quantum annealing machine or an Ising machine, for example, and a solution of the scheduling problem can be found as a result of the optimization function being processed by these machines.

According to the embodiment of the present invention, it is possible to create an optimization function for solving a scheduling problem on which predetermined constraint conditions are imposed, the optimization function relating to a variable that represents a quantum state.

Supplementary Note

Figure 6:
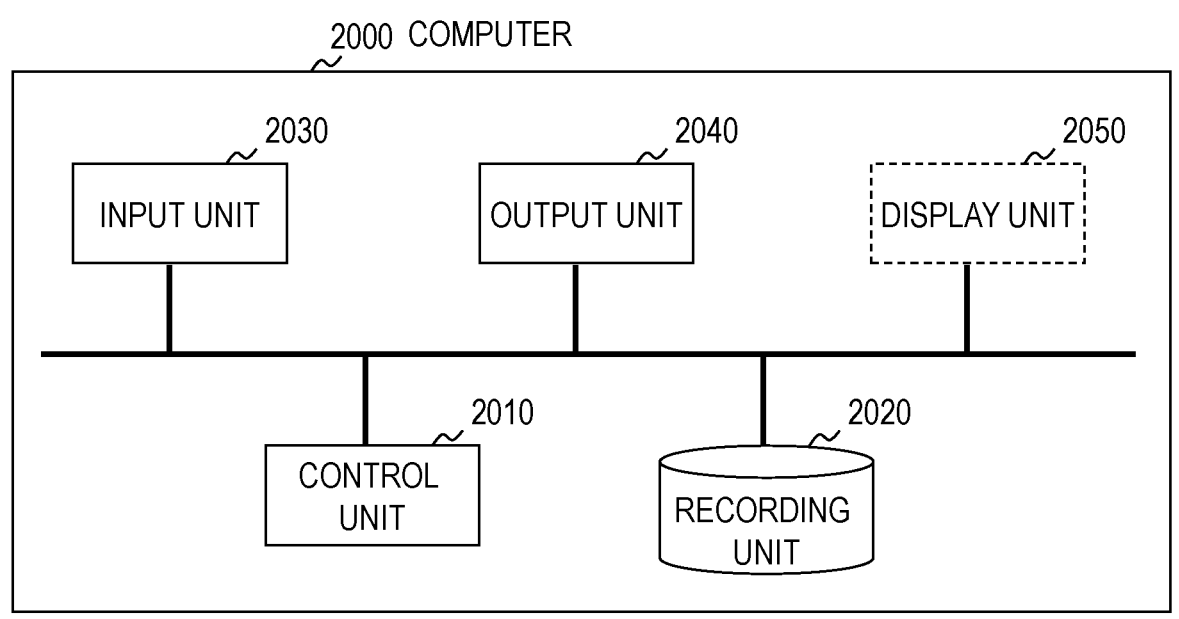
FIG. 6 is a diagram showing an example of a functional configuration of a computer that realizes each apparatus in an embodiment of the present invention.

FIG. 6 is a diagram showing an example of a functional configuration of a computer that realizes each apparatus described above. Processing performed in each apparatus described above can be implemented by causing a recording unit 2020 to read a program for causing the computer to function as the apparatus described above, and causing a control unit 2010, an input unit 2030, an output unit 2040, and the like to operate.

The apparatus according to the present invention is constituted by, for example, a single hardware entity that includes an input unit to which a keyboard or the like can be connected, an output unit to which a liquid crystal display or the like can be connected, a communication unit to which a communication device (e.g., communication cable) that enables communication with the outside of the hardware entity can be connected, a CPU (Central Processing Unit, which may include a cash memory, a register, etc.), RAM and ROM, which are memories, an external storage device that is a hard disk, and a bus that connects the input unit, the output unit, the communication unit, the CPU, the RAM, the ROM, and the external storage device to enable data exchange therebetween. It is also possible to provide the hardware entity with a device (drive) that can read data from and write data into a recording medium such as a CD-ROM, as necessary. An example of a physical entity including these hardware resources is a general-purpose computer.

A program that is necessary to realize the above-described functions and data and the like that are necessary for processing of the program are stored in the external storage device of the hardware entity (the program does not necessarily have to be stored in the external storage device, and may be stored in the ROM, which is a read-only storage device, for example). Data and the like that are obtained in the processing of the program are stored in the RAM or the external storage device as appropriate.

In the hardware entity, each program stored in the external storage device (or ROM, etc.) and data necessary for the processing of the program are read into a memory as necessary, and interpreted, executed, or processed by the CPU as appropriate. As a result, the CPU realizes predetermined functions (the constitutional units described above as units, means, etc.).

The present invention is not limited to the embodiment described above, and can be modified as appropriate within a scope not departing from the gist of the present invention. The pieces of processing described in the above embodiment do not necessarily have to be executed chronologically in the described order, and may be executed in parallel or individually as necessary or according to the processing capacity of the device that executes the processing.

As described above, in a case where processing functions of the hardware entity (apparatus according to the present invention) described in the above embodiment are realized by a computer, the processing content of the functions that are to be included in the hardware entity is described in a program. The processing functions of the hardware entity described above are realized in the computer as a result of the program being executed by the computer.

The program in which the processing content is described can be recorded in a computer-readable recording medium. It is possible to use any computer-readable recording medium such as a magnetic recording device, an optical disk, a magneto-optical recording medium, or a semiconductor memory. Specifically, it is possible to use a hard disk device, a flexible disk, a magnetic tape, or the like as a magnetic recording device, a DVD (Digital Versatile Disc), a DVD-RAM (Random Access Memory), a CD-ROM (Compact Disc Read Only Memory), a CD-R (Recordable)/RW (ReWritable), or the like as an optical disk, an MO (Magneto-Optical disc) or the like as a magneto-optical recording medium, and an EEP-ROM (Electronically Erasable and Programmable-Read Only Memory) or the like as a semiconductor memory.

The program is distributed by, for example, selling, transferring, or lending a portable recording medium such as a DVD or a CD-ROM on which the program is recorded. Furthermore, it is also possible to distribute the program by storing the program in a storage device of a server computer and transferring the program from the server computer to another computer via a network.

A computer that executes such a program initially stores, in a storage device of the computer, the program recorded on a portable recording medium or transferred from a server computer, for example. Then, when executing processing, the computer reads the program stored in the storage device of the computer and executes the processing in accordance with the read program. In another aspect of executing the program, the computer may read the program directly from the portable recording medium and execute the processing in accordance with the program. Alternatively, every time a program is transferred from the server computer to the computer, the computer may execute processing in accordance with the received program. A configuration is also possible in which the processing described above is executed by a so-called ASP (Application Service Provider) type service in which processing functions are realized only by instructing execution of the program and acquiring a result, without the program being transferred from the server computer to the computer. It should be noted that the program in this aspect includes information that is used in processing performed by an electronic computer and is equivalent to a program (e.g., data that is not a direct command for the computer but has the nature of defining processing of the computer).

In this aspect, a computer is caused to execute the predetermined program to constitute the hardware entity, but at least a portion of the processing content may be realized using hardware.

The above description of the embodiment of the present invention is presented for the purpose of illustration and description. The description is not intended to be comprehensive and to limit the present invention to the strict form disclosed. Alterations and variations can be made from the teachings described above. The embodiment was selected and described to provide the best illustration of the principle of the present invention such that those skilled in the art can use the present invention in various embodiments suitable for thoroughly considered practical use, and by adding various alterations. All of such alterations and variations are within the scope of the present invention defined by the appended claims that are interpreted with a fairly, legally, and equitably given range.

The invention claimed is:

1. An optimization function creation apparatus comprising:

an input setting circuitry configured to set a set P of processes, a set R of resources, a maximum time point End, the time p.time it takes to execute a process $p(\in P)$, a set p.precede$(\subseteq P)$ of processes of which execution needs to be completed before execution of the process p is started, and a set r.processes($\subseteq$P) of processes that require a resource r($\in$R) when executed, as input to a scheduling problem for creating a plan of execution start time points of processes such that execution of all processes included in the set P will be completed by the maximum time point End under predetermined constraint conditions;

an optimization function creation circuitry configured to create an optimization function for solving the scheduling problem using the input, the optimization function relating to a variable that represents a quantum state, wherein the constraint conditions comprise a first constraint condition that start(q)+q.time$\leq$start(p) holds true for processes p$\in$P and q$\in$p.precede, the start(p) represents an execution start time point of a process p, the constraint conditions further comprise a second constraint condition that {p$\in$r.processes|start(p)$\leq$t$\leq$start(p)+p.time}|$\leq$1 holds true for each time point t up to the maximum time point End and each resource r$\in$R, the optimization function is a function that takes the minimum value when the first constraint condition and the second constraint condition are satisfied, the variable that represents a quantum state is a quantum bit that represents a particular state by taking the value 1 and represents a state other than the particular state by taking the value 0, the optimization function is an objective function of Quadratic Unconstrained Binary Optimization ("QUBO") defined based on a function that expresses the first constraint condition and a function that expresses the second constraint condition, the function expressing the first constraint condition is a function that takes the value 0 when the first constraint condition is satisfied, and otherwise takes a value greater than 0, the function expressing the second constraint condition is a function that takes the value 0 when the second constraint condition is satisfied, and otherwise takes a value greater than 0, the variable that represents a quantum state is a variable that is defined so as to represent, with the value 1, a state where a time point t is at or after an execution start time point of a process p, the quantum bit is defined as a variable $x_{p,t}$ whose value is "1" in a case where the time point t is at or after the execution start time point of the process p, and otherwise "0," and the objective function of QUBO is defined as a function JSP, $$JSP = AfterStart + Order + Resource,$$

$$AfterStart = \sum_{0 \leq t < End-1} \sum_{p \in P} x_{p,t}(1 - x_{p,t+1}),$$

$$Order = \sum_{0 \leq t < End} \sum_{p \in P} \sum_{q \in p.precede} x_{p,t}(1 - x_{q,t-q.time}),$$

-continued $$Resource = \sum_{r \in R} \sum_{0 \leq t < End} Count(r, t)(Count(r, t) - 1),$$

$$Count(r, t) = \sum_{p \in r.processes} (x_{p,t} - x_{p,t-p.time})$$

the AfterStart represents a function expressing the meaning of the quantum bit $x_{p,t}$, the Order represents a function expressing the first constraint condition, and the Resource represents a function expressing the second constraint condition, and a process execution plan creation circuitry configured to create, by executing the optimization function solving the scheduling problem using the input, a process execution plan as output of the optimization function to schedule process execution.

2. A method for creating an optimization function, comprising:

an input setting step of setting, by an optimization function creation apparatus, a set P of processes, a set R of resources, a maximum time point End, the time p.time it takes to execute a process p($\in$P), a set p.precede($\subseteq$P) of processes of which execution needs to be completed before execution of the process p is started, and a set r.processes($\subseteq$P) of processes that require a resource r($\in$R) when executed, as input to a scheduling problem for creating a plan of execution start time points of processes such that execution of all processes included in the set P will be completed by the maximum time point End under predetermined constraint conditions;

an optimization function creating step of creating, by the optimization function creation apparatus, an optimization function for solving the scheduling problem using the input, the optimization function relating to a variable that represents a quantum state, wherein the constraint conditions comprise a first constraint condition that start(q)+q.time$\leq$start(p) holds true for processes p$\in$P and q$\in$p.precede, the start(p) represents an execution start time point of a process p, the constraint conditions further comprise a second constraint condition that |{p$\in$r.processes|start(p)$\leq$t$\leq$start(p)+p.time}|$\leq$1 holds true for each time point t up to the maximum time point End and each resource r$\in$R, the optimization function is a function that takes the minimum value when the first constraint condition and the second constraint condition are satisfied, the variable that represents a quantum state is a quantum bit that represents a particular state by taking the value 1 and represents a state other than the particular state by taking the value 0, the optimization function is an objective function of Quadratic Unconstrained Binary Optimization ("QUBO") defined based on a function that expresses the first constraint condition and a function that expresses the second constraint condition, the function expressing the first constraint condition is a function that takes the value 0 when the first constraint condition is satisfied, and otherwise takes a value greater than 0, the function expressing the second constraint condition is a function that takes the value 0 when the second constraint condition is satisfied, and otherwise takes a value greater than 0, the variable that represents a quantum state is a variable that is defined so as to represent, with the value 1, a state where a time point t is at or after an execution start time point of a process p, the quantum bit is defined as a variable $x_{p,t}$ whose value is "1" in a case where the time point t is at or after the execution start time point of the process p, and otherwise "0," and the objective function of QUBO is defined as a function JSP, $$JSP = AfterStart + Order + Resource,$$

$$AfterStart = \sum_{0 \le t < End-1} \sum_{p \in P} x_{p,t}(1 - x_{p,t+1}),$$

$$Order = \sum_{0 \le t < End} \sum_{p \in P} \sum_{q \in p.precede} x_{p,t}(1 - x_{q,t-q.time}),$$

$$Resource = \sum_{r \in R} \sum_{0 \le t < End} Count(r, t)(Count(r, t) - 1),$$

$$Count(r, t) = \sum_{p \in r.processes} (x_{p,t} - x_{p,t-p.time})$$

the AfterStart represents a function expressing the meaning of the quantum bit $x_{p,t}$, the Order represents a function expressing the first constraint condition, and the Resource represents a function expressing the second constraint condition; and a process execution plan creating step of creating, by executing the optimization function solving the scheduling problem using the input, a process execution plan as output of the optimization function to schedule process execution by the optimization function creation apparatus.

3. A non-transitory computer-readable recording medium storing a program for causing a computer to perform the method for creating an optimization function according to claim 2.

4. An optimization function creation apparatus comprising:

an input setting circuitry configured to set a set P of processes, a set R of resources, a maximum time point End, the time p.time it takes to execute a process p($\in$ P), a set p.precede($\subseteq$P) of processes of which execution needs to be completed before execution of the process p is started, and a set r.processes($\subseteq$P) of processes that require a resource r($\in$ R) when executed, as input to a scheduling problem for creating a plan of execution start time points of processes such that execution of all processes included in the set P will be completed by the maximum time point End under predetermined constraint conditions;

an optimization function creation circuitry configured to create an optimization function for solving the scheduling problem using the input, the optimization function relating to a variable that represents a quantum state, wherein the constraint conditions comprise a first constraint condition that start(q)+q.time$\le$start(p) holds true for processes p$\in$ P and q$\in$ p.precede, the start(p) represents an execution start time point of a process p, the constraint conditions further comprise a second constraint condition that {p$\in$ r.processes|start(p)

$\le$t$\le$start(p)+p.time}|1 holds true for each time point t up to the maximum time point End and each resource r$\in$ R, the optimization function is a function that takes the minimum value when the first constraint condition and the second constraint condition are satisfied, the variable that represents a quantum state is a quantum bit that represents a particular state by taking the value 1 and represents a state other than the particular state by taking the value 0, the optimization function is an objective function of Quadratic Unconstrained Binary Optimization ("QUBO") defined based on a function that expresses the first constraint condition and a function that expresses the second constraint condition, the function expressing the first constraint condition is a function that takes the value 0 when the first constraint condition is satisfied, and otherwise takes a value greater than 0, the function expressing the second constraint condition is a function that takes the value 0 when the second constraint condition is satisfied, and otherwise takes a value greater than 0, the variable that represents a quantum state is a variable that is defined so as to represent, with the value 1, a state where a time point t is at or after an execution start time point of a process p, the quantum bit is defined as a variable xp,t whose value is "1" in a case where the time point t is at or after the execution start time point of the process p, and otherwise "0," and the objective function of QUBO is defined as a function JSP, $$JSP = AfterStart + Order + Resource,$$

$$AfterStart = \sum_{0 \le t < End-1} \sum_{p \in P} (t + 1) * x_{p,t}(1 - x_{p,t+1}),$$

$$Order = \sum_{0 \le t < End} \sum_{p \in P} \sum_{q \in p.precede} x_{p,t}(1 - x_{q,t-q.time}),$$

$$Resource = \sum_{r \in R} \sum_{0 \le t < End} Count(r, t)(Count(r, t) - 1),$$

$$Count(r, t) = \sum_{p \in r.processes} (x_{p,t} - x_{p,t-p.time})$$

the AfterStart represents a function expressing the meaning of the quantum bit $x_{p,t}$, the Order represents a function expressing the first constraint condition, and the Resource represents a function expressing the second constraint condition, and a process execution plan creation circuitry configured to create, by executing the optimization function solving the scheduling problem using the input, a process execution plan as output of the optimization function to schedule process execution.

5. A method for creating an optimization function, comprising:

an input setting step of setting, by an optimization function creation apparatus, a set P of processes, a set R of resources, a maximum time point End, the time p.time it takes to execute a process p($\in$ P), a set p.precede($\subseteq$P) of processes of which execution needs to be completed before execution of the process p is started, and a set r.processes($\subseteq$P) of processes that require a resource r(∈ R) when executed, as input to a scheduling problem for creating a plan of execution start time points of processes such that execution of all processes included in the set P will be completed by the maximum time point End under predetermined constraint conditions;

an optimization function creating step of creating, by the optimization function creation apparatus, an optimization function for solving the scheduling problem using the input, the optimization function relating to a variable that represents a quantum state, wherein the constraint conditions comprise a first constraint condition that start(q)+q.time≤start(p) holds true for processes p∈ P and q∈ p.precede, the start(p) represents an execution start time point of a process p, the constraint conditions further comprise a second constraint condition that {p∈ r.processes|start(p) ≤t≤start(p)+p.time}|≤1 holds true for each time point t up to the maximum time point End and each resource r∈ R, the optimization function is a function that takes the minimum value when the first constraint condition and the second constraint condition are satisfied, the variable that represents a quantum state is a quantum bit that represents a particular state by taking the value 1 and represents a state other than the particular state by taking the value 0, the optimization function is an objective function of Quadratic Unconstrained Binary Optimization ("QUBO") defined based on a function that expresses the first constraint condition and a function that expresses the second constraint condition, the function expressing the first constraint condition is a function that takes the value 0 when the first constraint condition is satisfied, and otherwise takes a value greater than 0, the function expressing the second constraint condition is a function that takes the value 0 when the second constraint condition is satisfied, and otherwise takes a value greater than 0, the variable that represents a quantum state is a variable that is defined so as to represent, with the value 1, a state where a time point t is at or after an execution start time point of a process p, the quantum bit is defined as a variable $x_{p,t}$ whose value is "1" in a case where the time point t is at or after the execution start time point of the process p, and otherwise "0," and the objective function of QUBO is defined as a function JSP, $$JSP = AfterStart + Order + Resource,$$

$$AfterStart = \sum_{0 \leq t < End-1} \sum_{p \in P} (t+1) * x_{p,t}(1 - x_{p,t+1}),$$

$$Order = \sum_{0 \leq t < End} \sum_{p \in P} \sum_{q \in p.precede} x_{p,t}(1 - x_{q,t-q.time}),$$

$$Resource = \sum_{r \in R} \sum_{0 \leq t < End} Count(r, t)(Count(r, t) - 1),$$

$$Count(r, t) = \sum_{p \in r.processes} (x_{p,t} - x_{p,t-p.time})$$

the AfterStart is a function expressing the meaning of the quantum bit $x_{p,t}$, the Order is a function expressing the first constraint condition, and the Resource is a function expressing the second constraint condition; and a process execution plan creating step of creating, by executing the optimization function solving the scheduling problem using the input, a process execution plan as output of the optimization function to schedule process execution by the optimization function creation apparatus.

6. A non-transitory computer-readable recording medium storing a program for causing a computer to perform the method for creating an optimization function according to claim 5.

\* \* \* \* \*